United States Patent
Gerhards

(10) Patent No.: US 6,772,495 B1
(45) Date of Patent: Aug. 10, 2004

(54) DOOR PANEL TOOL

(76) Inventor: Timothy Allen Gerhards, 520 Rockport Cir., Folsom, CA (US) 95630

( * ) Notice: Subject to any disclaimer, the term of this patent is extended or adjusted under 35 U.S.C. 154(b) by 8 days.

(21) Appl. No.: 09/956,295

(22) Filed: Sep. 18, 2001

(51) Int. Cl.$^7$ ............................................. B23P 11/00
(52) U.S. Cl. .................................................. 29/243.5
(58) Field of Search ........................... 29/243.5, 243.58, 29/254, 275; 72/479

(56) References Cited

U.S. PATENT DOCUMENTS

| 2,637,292 A | * | 5/1953 | George | ........................ 72/479 |
| 6,543,270 B2 | * | 4/2003 | Cmelik | ........................ 72/479 |

* cited by examiner

*Primary Examiner*—Robert C. Watson
(74) *Attorney, Agent, or Firm*—Risto A. Rinne, Jr.

(57) ABSTRACT

An apparatus and method for rapidly and safely installing a door panel over an automobile door frame includes a rectangular solid body that is preferably formed of a polyethylene plastic. The body includes a nose portion that has a recessed area. The recessed area has a tapered plane that is used to progressively urge the panel around a lip of the frame when the body is impacted, such as by an air impact hammer. The body has an opposite end distally disposed from the nose that includes a cylindrical recess which is adapted to receive a shaft therein, the shaft being adapted for use with the air impact hammer. A fin extends from the nose portion at an angle with respect to the shaft and is used to prevent the tool from rolling into the panel during installation. In use a first pass around the perimeter of the panel is made with the tool close to normal to initially set the panel in position around the lip. A second pass is then made at more of an angle to complete the crimp of the panel fully around the lip.

7 Claims, 1 Drawing Sheet

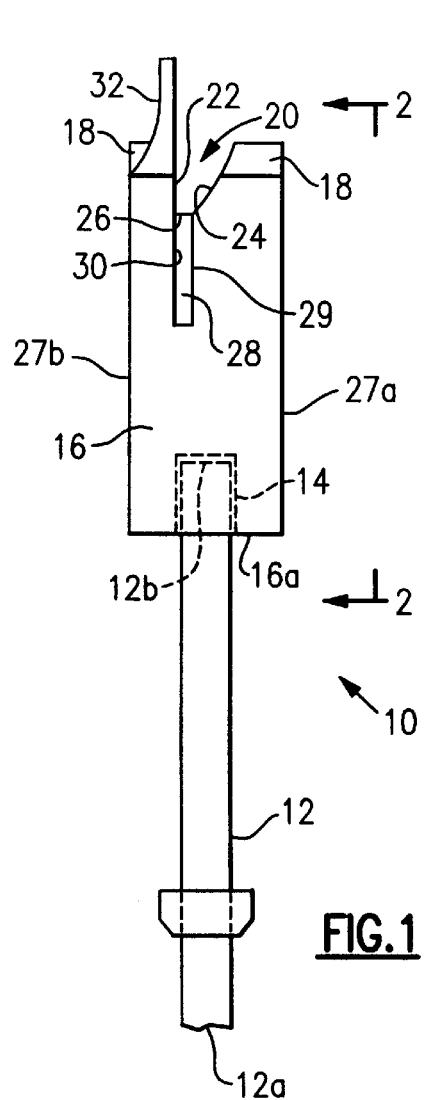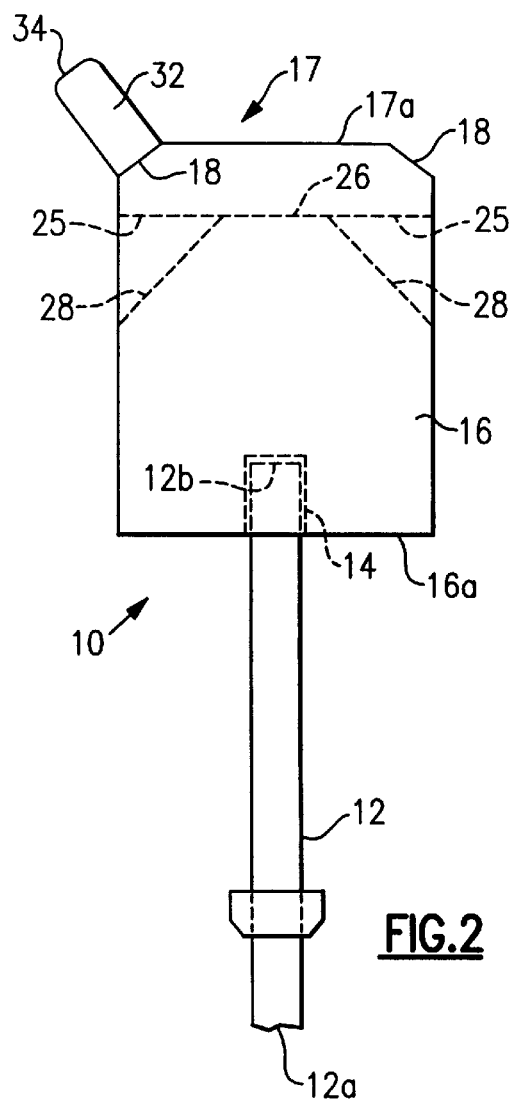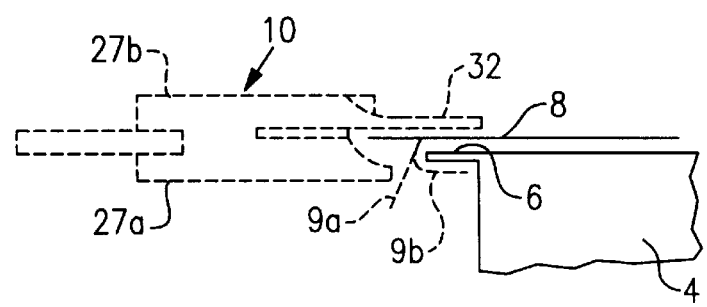

DOOR PANEL TOOL

BACKGROUND OF THE INVENTION

1. Field of the Invention

The present invention, in general relates to the repair of automobile doors and, more particularly, to devices that are used to replace the panel. (i.e., the skin) of the door.

For a variety of reasons doors, as other exterior parts of automobiles, become damaged and need replacing. Often it is easier to replace the covering (i.e., the panel) over a door frame than it is to attempt to repair the dent or dents. The panels that cover doors are also known as "skins" in the industry, and the term "panel" as used herein includes any type of a sheet covering that is applied over the door frame.

Currently, there are tools that assist this process. However, they either require adjustment or are prone to damage the panel during installation. Furthermore, many passes must be accomplished first to set the panel in position and then to increasingly fold and wrap the panel around a lip that is provided in a door frame.

For a highly skilled installer to install a door panel, using currently available tools, it takes from thirty to forty-five minutes of time. Since door panels are often replaced, this process is done repetitively. Being able to shorten the time required or to allow less skilled installers to apply the door panels would be of economic benefit to all concerned.

Accordingly there exists today a need for a door panel tool that shortens the time required to install a door panel over a door frame and which lessens the likelihood of damaging the panel during installation.

Clearly, such an apparatus would be a useful and desirable device.

2. Description of Prior Art

Door panel tools are, in general, known. For example, the following patents describe various types of these or other similar devices:

U.S. Pat. No. 4,926,536 to Kohut, May 22, 1990;
U.S. Pat. No. 4,318,211 to Hoskinson, Mar. 9, 1982;
U.S. Pat. No. 4,274,352 to Hamel, Jun. 23, 1981;
U.S. Pat. No. 4,120,256 to Semler, Oct. 17, 1978;
U.S. Pat. No. 4,060,046 to Eckold et al., Nov. 29, 1977;
U.S. Pat. No. 3,800,387 to Hamilton, Apr. 2, 1974;
U.S. Pat. No. 3,602,032 to Skintzis, Aug. 31, 1971; and
U.S. Pat. No. 3,477,272 to Hunter, Nov. 11, 1969.

While the structural arrangements of the above described devices, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a door panel tool that decreases the amount of time that is required to install a door panel over a door frame of an automobile.

It is also an important object of the invention to provide a door panel tool that decreases the number of passes that are required to install a door panel over a door frame of an automobile.

Another object of the invention is to provide a door panel tool that can be used with a pneumatic driver.

Still another object of the invention is to provide a door panel tool that does not mar a door panel during use.

Still yet another object of the invention is to provide a door panel tool that is effective at installing a door panel over a door frame of an automobile.

Yet another important object of the invention is to provide a door panel tool that is inexpensive to produce.

Still yet another important object of the invention is to provide a door panel tool that is durable.

Briefly, a door panel tool that is constructed in accordance with the principles of the present invention has a plastic body that includes a nose section. The nose section includes a frontal plane and two oppositely angled sides that converge on the frontal plane. A recessed area is provided in the body proximate the nose section that includes a planar frontal portion that is recessed in the body and is disposed proximate to and parallel with respect to the frontal plane and a second pair of oppositely angled sides that converge on the frontal plane. A tapered plane extends from one side of the planar frontal portion to the frontal plane of the nose. On a side of the nose section that is opposite the tapered plane and on one of the angled sides, a lip extends out from the body at an angle corresponding to that of the angled side. The lip includes a bottom that is in planar alignment with respect to a primary plane of the recessed area. A cylindrical recess is provided in an end of the body that is opposite the frontal plane. The cylindrical recess is adapted to receive a shaft of the variety that are used with air (pneumatic) impact hammers. In use, the tool is disposed so that the tapered plane initially sets a door panel over the frame to secure it in position. The tool is then angled and another pass is made whereby the tool provides a finishing crimp. The lip prevents the tool from rolling into the panel during installation and possibly creasing the panel.

BRIEF DESCRIPTION OF THE DRAWINGS

FIG. 1 is a side view of a door panel tool.

FIG. 2 is a view as shown in FIG. 1 as seen along the lines 2—2 therein.

FIG. 3 is a cross-sectional view of the door panel tool of FIG. 1 shown in dashed lines being used to install a door panel onto a door frame.

DETAILED DESCRIPTION OF THE INVENTION

Referring on occasion to all of the FIG. 1, FIG. 2 and FIG. 3 drawings is shown, a door panel tool, identified in general by the reference numeral 10.

Referring momentarily now to FIG. 3, a car door frame 4 includes a lip 6. A new panel 8 (i.e., skin) is to be initially bent around the lip 6 so it stays in place. This is sometimes called setting it in place.

A first dashed line 9a shows how the panel 8 looks after a first pass with door panel tool 10 has been accomplished. A second dashed line 9b shows how the panel 8 looks after a second pass (finishing pass) has been made with the door panel tool 10.

Use of the door panel tool 10 is described in greater detail hereinafter. The benefits from the use of the door panel tool 10 is that the panel 8 is rapidly installed, is not damaged during installation, and fits tightly around the lip 6, ready for painting.

Referring now primarily to FIGS. 1 and 2 the door panel tool 10 is adapted to receive a standard and well known type of a shaft 12 such as of the type that is adapted for use with standard and well known types of an air impact hammer (not shown). The shaft 12 includes first end 12a that is inserted into the air impact hammer and a second end 12b that fits into a cylindrical recess 14 that extends a predetermined distance into a body 16 of the tool 10 at a bottom end 16a thereof. The shaft 12 can be pulled out of the cylindrical recess 14 when the body 16 wears out and can then be placed in the cylindrical recess 14 of a new body (not shown) for subsequent use.

The body 16 is preferably made from a polyethylene type of plastic because it is smooth and glides over the panel 8 as if it were naturally lubricated.

The body 16 includes a nose section, identified in general by the reference numeral 17. The nose section 17 is disposed distally from the bottom end 16a and it includes a frontal plane 17a and two oppositely angled sides 18 that converge on opposite sides of the frontal plane 17a and extend outward and toward the bottom end 16a.

A recessed area, identified in general by the reference numeral 20, is provided in the body 16 proximate the nose section 17.

The recessed area 20 includes a planar frontal portion 26 that is closest to and parallel with respect to the frontal plane 17a and a second pair of oppositely angled sides 28 that converge on opposite ends of the planar frontal portion 26 and extend outward toward the sides of the body 16 and toward the bottom end 16a.

A tapered plane 24 begins at a first end thereof at a line 25 (shown in dashes FIG. 2) that is disposed on one side of the planar frontal portion 26. The line 25 where the first end thereof of the tapered plane 24 begins extends past the sides of the planar frontal portion 26 to opposite sides of the body 16.

The tapered plane 24 continues to extend at an angle that brings it generally closer to a first face 27a of the body 16. The remaining opposite end of the tapered plane 24 terminates at the frontal plane 17a of the nose 17 and is closer to the first face 27a than is the first end thereof.

A first parallel planar surface 29 extends from a side of each of the second pair of oppositely angled sides 28 that is in alignment with the line 25 outward to the side of the body 16. The first parallel planar surface 29 is in parallel planar alignment with the first face 27a of the body 16.

A second parallel planar surface 30 extends from a side of each of the second pair of oppositely angled sides 28 that is closest to a second face 27b of the body. The second face 27b is parallel and opposite with respect to the first face 27a. The second parallel planar surface 30 is in parallel planar alignment with the second face 27b of the body 16.

Intermediate the first and second parallel planar surfaces 29, 30 is provided a narrow opening that extends from the second pair of oppositely angled sides 28 to the sides of the body 16.

The second parallel planar surface 30 extends past the planar frontal portion 26 to each of the two oppositely angled sides 18 and to the frontal plane 17a.

At one of the two oppositely angled sides 18, the second parallel planar surface 30 continues to extend outward away from the body to form the underside of a fin 32. The second parallel planar surface 30 forms a primary plane of the recessed area 20.

The fin 32 extends away from the body 16 for a predetermined distance at an angle that corresponds with that of one of the two oppositely angled sides 18. The fin 32 includes a rounded end 34 and a predetermined minimum thickness. An opposite side of the fin 32 extends in an arcuate taper to the second face 27b of the body 16.

In use, the door panel tool 10 is disposed as shown in FIG. 3 with the shaft 12 substantially normal with respect to the surface edge of the lip 6. A first pass is made by lightly impacting the panel 8 so as to "set" an edge of the panel 8 into a first position as shown by a first dashed line 9a.

The "set" displaces the edge of the door panel 8 over the lip 6 of the frame 4 sufficient to secure it temporarily in position when air is supplied under pressure to the air impact hammer and the door panel tool 10 is moved around the perimeter of the frame 4.

The door panel tool 10 is then positioned so that the shaft 12 is held at an angle that is further away from normal while still maintaining a longitudinal axis of the shaft 12 in planar alignment with the lip 6. A second pass is then made by moving the tool 10 along the perimeter while supplying air under pressure to the air impact hammer.

This second pass provides a finishing crimp that bends the panel 8 to the position shown by a second dashed line 9b. The first and second passes are extended fully around the perimeter of the lip 6 and the panel 8 is quickly installed.

The fin 32 prevents the door panel tool 10 from inadvertently being displaced away from planar alignment with the lip 6 whereby it might otherwise roll into the panel 8 during installation and possibly crease the panel 8. The tool 10 is angled (with respect to the longitudinal axis of the shaft 12) to provide for the smooth movement of the door panel tool 10 when the shaft 12 of the tool 10 is angled away from normal and also to allow full crimping of the panel 8 around the lip 6 to occur by allowing contact of the panel 8 to occur also with portions of the second pair of oppositely angled sides 28 and with the planar frontal portion 26, as needed, in the recessed area 20.

Once installed, the panel 8 is ready for finish painting.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A door panel tool for installing a door panel over a lip of a frame of an automobile door, comprising:

(a) a body, said body including a generally rectangular cubic structure and having a nose portion and an opposite end, and wherein said body includes a recessed area that includes a tapered plane, and wherein said tapered plane is adapted to progressively urge an edge of said door panel around said lip sufficient to secure said door panel thereto; and (b) means for impacting said body sufficient to urge said edge around said lip wherein said means for impacting includes a cylindrical recess formed in said opposite end, said cylindrical recess adapted to receive one end of a shaft therein and wherein a remaining end of said shaft is adapted to cooperate with an air actuated impact hammer and wherein said one end of said shaft is detachably-attachable with respect to said cylindrical recess.

2. The door panel tool of claim 1 wherein said body is formed of a plastic.

3. The door panel tool of claim 2 wherein said plastic is formed of a polyethylene material.

4. The door panel tool of claim 1 wherein said body includes a fin that extends from said nose portion and wherein said fin is adapted to prevent said door panel tool from creasing said panel during installation.

5. The door panel tool of claim 4 wherein said nose portion includes a frontal plane and two oppositely angled sides that converge on said frontal plane and wherein said fin extends from one of said two oppositely angled sides.

6. The door panel tool of claim 5 wherein said recessed area includes a primary plane and wherein a bottom plane of said fin is included in said primary plane.

7. The door panel tool of claim 6 wherein said recessed area includes a planar frontal portion and a second pair of oppositely angled sides that extend from said planar frontal portion toward said opposite end sufficient to form an opening on each side of said body and wherein said primary plane extends along one face of said opening on each side of said body.

* * * * *